United States Patent [19]

Coleman

[11] 4,195,134
[45] Mar. 25, 1980

[54] POLYESTER RESIN WITH IMPROVED RETENTION OF PROPERTIES

[75] Inventor: Ernest A. Coleman, Kinnelon, N.J.

[73] Assignee: GAF Corporation, New York, N.Y.

[21] Appl. No.: 971,870

[22] Filed: Dec. 21, 1978

[51] Int. Cl.² ............................................. C08L 63/00
[52] U.S. Cl. ................................... 525/65; 525/117; 525/902
[58] Field of Search ........................................ 260/835

[56] References Cited

U.S. PATENT DOCUMENTS

| | | | |
|---|---|---|---|
| 3,560,605 | 2/1971 | Siggel | 260/835 |
| 3,886,104 | 5/1975 | Borman | 260/835 |
| 3,909,845 | 9/1975 | Hongo | 260/835 |
| 3,965,212 | 6/1976 | Kamada | 260/835 |
| 4,010,219 | 3/1977 | Aoyama | 260/835 |
| 4,034,013 | 7/1977 | Lane | 260/835 |
| 4,035,333 | 7/1977 | Kamada | 260/835 |
| 4,073,827 | 2/1978 | Okasaka | 260/835 |
| 4,096,202 | 6/1978 | Farnham | 260/873 |

FOREIGN PATENT DOCUMENTS

| | | | |
|---|---|---|---|
| 2457148 | 6/1975 | Fed. Rep. of Germany | 260/835 |
| 4860143 | 11/1971 | Japan | 260/835 |

*Primary Examiner*—Paul Lieberman
*Attorney, Agent, or Firm*—Joshua J. Ward; Walter C. Kehm

[57] ABSTRACT

Polyester compositions comprising a blend of poly ($C_2$-$C_4$ alkylene terephthalate) with a diepoxy compound and a multiphase composite polymer are disclosed. The multiphase polymer has a first elastomeric phase polymerized from a monomer system including $C_1$-$C_6$ alkyl acrylate as well as crosslinking and graftlinking monomers and a final rigid thermoplastic phase polymerized in the presence of the elastomeric phase.

13 Claims, No Drawings

POLYESTER RESIN WITH IMPROVED RETENTION OF PROPERTIES

BACKGROUND OF THE INVENTION

Poly ($C_2$-$C_4$ alkylene terephthalate) such as polyethylene terephthalate (PET) or polybutylene terephthalate (PBT) are well known resins for a number of uses including molding applications. Such resins are frequently blended with various additives to improve properties such as impact strength, resistance to warping, flame resistance, thermal stability etc. U.S. Pat. No. 4,096,202 and U.S. Pat. No. 4,034,013 describe certain impact modifiers which have been suggested for use with polyalkylene terephthalates. U.S. Pat. No. 4,010,219 describes certain epoxy compounds which have been suggested for use in imparting improved tensile properties to polybutylene terephthalate molding compounds.

One of the properties of polyalkylene terephthalate molding resins which has been troublesome in a number of end uses such as plumbing systems is hydrolytic stability. Hydrolytic stability is especially important where molded articles are subjected to moisture or high humidity over a period of time or at high temperatures.

It has now been found that a combination of additives individually known for use in polyalkylene terephthalate molding compositions for other purposes can also, and quite unexpectedly, serve to improve the hydrolytic stability of such compositions.

SUMMARY OF THE INVENTION

It is accordingly an object of the present invention to provide improved polyester compositions suitable for the production of molded articles as well as a process for producing molded articles from such compositions and molded articles of such compositions. As compared with known prior art compositions, molded articles of the invention have a combination of desirable properties including improved hydrolytic stability without sacrifice of other desirable properties.

Polyester composition of the invention comprises a blend of:

(a) at least about 40 weight percent poly ($C_2$-$C_4$ alkylene terephthalate);

(b) between about 0.1 and about 15 weight % based on poly ($C_2$-$C_4$ alkylene terephthalate) of a diepoxy compound represented by the general formula:

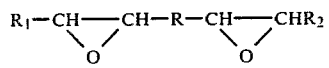

Formula I wherein $R_1$ and $R_2$ represent hydrogen, alkyl, cycloalkyl, aryl, or aralkyl, and $R_1$ and $R_2$ may be bonded to each other, and R represents alkylene, cycloalkylene, arylene, alkarylene or aralkylene, each of which may optionally have an ether group and/or an ester group, and R may be optionally bonded to $R_1$ and/or $R_2$; and (c) between about 5 and about 20 weight % based on poly ($C_2$-$C_4$) alkylene terephthalate) of a multiphase composite polymer comprising;

(1) about 25 to about 95 weight percent of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and (2) about 75 to 5 weight % of a final, rigid thermoplastic phase polymerized in the presence of said elastomeric phase.

In a preferred embodiment the poly ($C_2$-$C_4$ alkylene terephthalate) comprises at least about 60 weight percent (wt%) polybutylene terephthalate (PBT) having an intrinsic viscosity between about 0.5 and about 1.5 deciliters per gram (dl/g) as determined in orthochlorophenol at 25° C. Further preferred embodiments involve the use of glass reinforcing fibers in amounts between about 1 and about 100 weight percent based on polyalkylene terephthalate as well as preferred multiphase polymer and diepoxy compounds as described below.

DETAILED DESCRIPTION OF THE INVENTION

Polyalkylene terephthalates suitable for use in the invention include for instance polyethylene terephthalate, polypropylene terephthalate, and polybutylene terephthalate. Polybutylene terephthalate (PBT) is especially suitable and in a preferred embodiment of the invention comprises at least about 60 weight percent of the polyalkylene terephthalate used. The polyalkylene terephthalate used may be a single polyalkylene terephthalate or a blend of suitable polyalkylene terephthalates. As mentioned the composition of the invention includes at least about 40 weight percent poly ($C_2$-$C_4$ alkylene terephthalate). An especially preferred poly ($C_2$-$C_4$ alkylene terephthalate) comprises at least about 60 weight percent PBT having an intrinsic viscosity between about 0.5 and about 1.5 dl/g.

The diepoxy compound present in compositions of the invention is present in amounts between about 0.1 and about 15 weight percent based on poly ($C_2$-$C_4$ alkylene terephthalate) and is represented by the general formula:

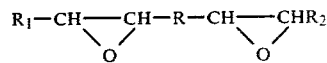

wherein $R_1$ and $R_2$ represent hydrogen, alkyl, cycloalkyl, aryl, or aralkyl, and $R_1$ and $R_2$ may be bonded to each other, and R represents alkylene, cycloalkylene, arylene, alkarylene or aralkylene, each of which may optionally have an ether group and/or an ester group, and R may be optionally bonded to $R_1$ and/or $R_2$.

Suitable diepoxy compounds which may be used in the practice of this invention include polycondensates of epihalohydrin such as epichlorohydrin with a diol, preferably having up to 15 carbon atoms, such as diphenylolpropane (so called bisphenol "A") in any ratio, bis-(2,3-epoxypropanol)-esters obtained by esterification of dicarboxylic acids, preferably having up to 15 carbon atoms, such as terephthalic acid, phthalic acid, 2,6-naphthalenedicarboxylic acid, adipic acid, succinic acid and dodecane dicarboxylic acid with 2,3-epoxypropanol, and cycloaliphatic diepoxides, preferably having 5–15 carbon atoms, such as cyclooctadiene-(1,5)-diepoxide, 1,2,5,6-diepoxy cyclododecane-(9), bicycloheptadiene diepoxide, and dicyclopentadiene diepoxide.

The multiphase composite polymer used in compositions of the invention comprises from about 25 to about 95 weight percent of a first elastomeric phase and about 75 to 5 weight percent of a final rigid thermoplastic phase. One or more intermediate phases are optional, for example a middle stage polymerized from about 75 to 100 percent by weight styrene. The first stage is polymerized from about 75 to 99.8 weight percent $C_1$ and $C_6$ acrylate resulting in an acrylic rubber core having a glass transition temperature below about 10° C. and crosslinked with 0.1 to 5 weight percent crosslinking monomer and further containing 0.1 to 5 percent by weight graftlinking monomer. The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate. The graftlinking monomer is a polyethylenically unsaturated monomer having a plurality of addition polymerizable reactive groups, at least one of which polymerizing at a substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomer particles. When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer. Among the effective graftlinking monomers are allyl group-containing monomers of allyl esters of ethylenically unsaturated acids such as allyl acrylate, allyl methacrylate, diallyl maleate, diallyl fumarate, diallyl itaconate, allyl acid maleate, allyl acid The final stage monomer system can be comprised of $C_1$ to $C_{16}$ methacrylate, styrene, acrylonitrile, alkyl acrylates, allyl methacrylate, diallyl methacrylate, and the like, as long as the overall glass transition temperature is at least about 20° C. Preferably the final stage monomer system is at least about 50 weight percent $C_1$ to $C_4$ alkyl methacrylate. It is further preferred that the final stage polymer be free of units which tend to degrade poly(alkylene terephthalates), for example acid, hydroxyl, amino, and amide groups.

For further descriptions and examples of various multiphase polymers and diepoxy compounds suitable for use in the present invention, reference may be had to to the aforementioned U.S. Pat. Nos. 4,010,219 and 4,096,202 the disclosures of which are incorporated herein by reference. Additional examples of multiphase polymers suitable for use in the invention may be found in U.S. Pat. No. 4,034,013 the disclosure of which is also incorporated herein by reference.

A suitable diepoxy compound for use in the invention is for instance, a bisphenol A diglycidyl ether of formula II where n is normally zero:

Compositions and products of the invention may also contain up to about 25 weight percent based on polyalkylene terephthalate of suitable flame retardant additives and may contain relatively minor amounts of other materials which do not unduly effect the desired characteristics of finished products. Such additional materials may, depending upon the particular compositions employed and products desired include for instance, colorants or lubricants. Where present such additional materials other than flame retardants or filler normally comprise not more than about 10 weight percent of the total molding composition or finished product.

Compositions and products of the invention may also include reinforcing fibers or inert filler of conventional types and amounts. In a preferred embodiment between about 5 and about 100 weight percent based on polyalkylene terephthalate of glass reinforcing fibers is present. Inert filler material where used is normally present in amounts between about 10 and about 100 weight percent based on polyalkylene terephthalate and may include such materials as glass spheres, clay, silica, silicates, oxides, etc. such filler material is frequently of low aspect ratio such as aspect ratios less than about 3 and has diameters averaging between about 0.2 and about 50 microns, and materials such as mica and talc.

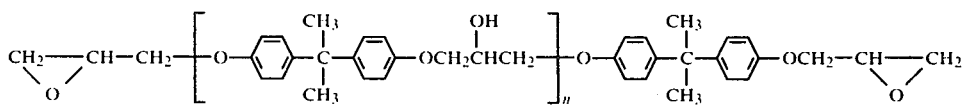

Formula II fumarate, and allyl acid itaconate. Somewhat less preferred are the diallyl esters of polycarboxylic acids which do not contain polymerizable unsaturation. The preferred graftlinking monomers are allyl methacrylate and diallyl maleate. A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate.

In preparing compositions of the invention the various ingredients may be prepared by conventional methods and blended in any suitable manner such as by dry blending or melt blending, blending in extruders, heated rolls, or other types of mixers. Conventional master batching techniques may also be used. Suitable manufacture and blending techniques are well known in the art and need not be described in detail here.

Compositions according to the invention are especially useful in imparting improved hydrolytic stability to PBT of relatively low intrinsic viscosity, especially where the viscosity of the PBT is below 1.0 dl/g such as in the range of about 0.5–1.0 dl/g. This makes the present invention especially significant with respect to such PBT of relatively low intrinsic viscosity since, as is well known, PBT of higher intrinsic viscosity is generally more expensive to manufacture. Thus by use of the present invention it is frequently possible to employ for a given end use PBT compositions utilizing PBT of significantly lower intrinsic viscosity than would normally be considered acceptable in terms of hydrolytic stability.

The following examples are intended to illustrate the invention without limiting the scope thereof. In the examples all quantities are given in terms of weight percent based on total compositions unless otherise stated.

In order to evaluate hydrolytic stability of the various compositions tested, samples of the compositions in question were injection molded to produce standard ASTM test specimens. Specimens were then tested for notched Izod impact strength in accordance with ASTM procedure D-256. Impact strength was determined immediately following manufacture of the test specimens (reported "as made"). Specimens were also tested for impact strength after being submerged in boiling water for two days or four days as indicated below. Retention of impact strength after submerging in boiling water for a period of days is considered to correlate well with ability of a plastic part to function in a hot, humid enviornment or in the presence of hot water. Satisfactory retention of impact strength following this test would thus indicate suitability for use of moldings made from such compositions in applications such as hot water plumbing systems where the molded parts must be able to function satisfactorily in the presence of hot water for extended periods of time.

Compositions tested as reported herein were prepared from several different PBT compositions as indicated in the examples. The compositions were compounded on a Midland Ross 1.5 inch extruder using the following conditions: temperature 240°–270° C., pressure 0–2000 psi, amperage 10–30 and screw RPM 75–150. In each case the pelletized extrudate was then molded on a reciprocating screw injection molding machine to provide test specimens.

In the examples the term "epoxy" designates an epoxy compound of Formula II and the term "latex" designates a multiphase composite polymer marketed by Rohm & Haas as their latex 7709-XP. This material contains about 71 weight percent butylacrylate, about 24 weight percent methyl methacrylate, about 3 weight percent glycidal methacrylate, and about 2 weight percent styrene.

EXAMPLE 1

For this example a number of compositions were prepared utilizing PBT having an intrinsic viscosity of 0.8 dl/g and containing additional components as indicated in Table I below. These samples were tested for notched Izod impact strength as made and after two days and four days in boiling water as described above. The results of these tests are also shown in Table I.

TABLE I

| | PBT of 0.8 Intrinsic Viscosity | | | | | |
|---|---|---|---|---|---|---|
| | Ingredients (Weight %) | | | Notched Izod Impact Strength (lb/in) | | |
| | | | | Time in Boiling Water | | |
| Run No. | PBT | Epoxy | Latex | as made | 2 day | 4 day |
| 1 | 100 | — | — | 0.7 | 0.6 | — |
| 2 | 99 | 1 | — | 0.6 | 0.5 | — |
| 3 | 97 | 3 | — | 0.6 | 0.6 | — |
| 4 | 95 | — | 5 | 0.7 | 0.6 | — |
| 5 | 85 | — | 15 | 1.0 | 0.8 | — |
| 6 | 100 | — | — | 0.6 | 0.6 | 0.4 |
| 7 | 90 | — | 10 | 0.8 | 0.6 | 0.6 |
| 8 | 80 | — | 20 | 1.0 | 0.6 | 0.8 |
| 9 | 89 | 1 | 10 | 0.8 | 0.8 | — |
| 10 | 87 | 3 | 10 | 0.9 | 0.7 | — |
| 11 | 93.5 | 1.5 | 5 | 0.7 | — | 0.8 |
| 12 | 88.5 | 1.5 | 10 | 0.8 | — | 0.9 |
| 13 | 80 | — | 20 | 1.0 | — | 0.6 |
| 14 | 78.5 | 1.5 | 20 | 1.0 | — | 1.0 |
| 15 | 68.5 | 1.5 | 30 | 1.3 | — | 1.2 |

From Table I it can be seen that with one exception impact strength after 2 days in boiling water was 0.6 or less for test specimens made from both straight PBT of 0.8 IV and from the same PBT containing either epoxy or latex additives of the invention but not both. By contrast impact strength after at least 2 and in many cases 4 days in boiling water for test specimens made from PBT containing both epoxy and latex additives, was without exception in excess of 0.6 and, depending upon exact amounts of the various additives used, ran as high as 1.2. The different impact strengths obtained after 4 days in boiling water between the material of run 13 containing only latex additive and a comparable material of run 14 containing 1.5 weight percent epoxy are believed especially significant.

EXAMPLE 2

For this example a number of compositions were prepared utilizing PBT having an intrinsic viscosity of 0.9 dl/g and containing additional components as indicated in Table II below. These samples were tested for notched Izod impact strength as made and after 2 days and 4 days in boiling water as indicated in Table II and as described above. The results of these tests are shown in Table II.

TABLE II

| | PBT of 0.9 Intrinsic Viscosity | | | | |
|---|---|---|---|---|---|
| | Ingredients (Weight %) | | | Notched Izod Impact Strength (lb/in) | |
| | | | | | 4 day |
| Run No. | PBT | Epoxy | Latex | as made | Boiling Water |
| 16 | 100 | — | — | 0.6 | 0.3 |
| 17 | 98.5 | 1.5 | — | 0.8 | 0.5 |
| 18 | 92.5 | — | 7.5 | 1.0 | 0.5 |
| 19 | 85 | — | 15 | 1.2 | 0.6 |
| 20 | 91 | 1.5 | 7.5 | 0.9 | 0.9 |
| 21 | 83.5 | 1.5 | 15 | 1.2 | 1.1 |
| 22 | 76 | 1.5 | 22.5 | 1.4 | 1.2 |
| 23 | 91 | 1.5 | 7.5 | 0.9 | 1.0 |

From Table II it can be seen that PBT of 0.9 IV containing both epoxy and latex additives in accordance with the invention yielded test specimens having impact strengths after 4 days in boiling water significantly in excess of the impact strengths for those samples which contained either no additive or only one of the two additives required by the invention. Specifically it should be noted that the control samples of run 16 yielded test specimens with an impact strength of only 0.3 while the specimens from runs 17-19 had impact strengths of 0.5-0.6. By contrast specimens made from material of runs 20-23 in accordance with the invention had impact strengths after 4 days in boiling water of 0.9-1.2. Again, the most significant comparisons are believed to be between materials containing the same amount of latex i.e. those of runs 18, 20 and 23.

EXAMPLE 3

For this example a number of compositions were prepared utilizing PBT having an intrinsic viscosity of 1.1 dl/g and containing additional components as indicated in Table III below. These samples were tested for notched Izod impact strength as made and after 2 days in boiling water as described above. The results of these tests are shown in Table III.

TABLE III

PBT of 1.1 Intrinsic Viscosity

| Run No. | Ingredients (Weight %) | | | Notched Izod Impact Strength (lb/in) | | |
|---|---|---|---|---|---|---|
| | PBT | Epoxy | Latex | as made | Boiling Water 2 day | 4 day |
| 24 | 100 | — | — | 1.0 | 0.8 | — |
| 25 | 98 | 2 | — | 0.9 | 0.8 | — |
| 26 | 90 | — | 10 | 2.0 | 1.8 | — |
| 27 | 88 | 2 | 10 | 1.9 | 1.6 | — |
| 28 | 93.5 | 1.5 | 5 | 1.3 | — | 0.9 |
| 29 | 83.5 | 1.5 | 15 | 1.9 | — | 1.6 |
| 30 | 73.5 | 1.5 | 25 | 2.4 | — | 1.9 |

From Table III it can be seen that even with PBT of relatively high intrinsic viscosity (I.V. of 1.1) impact strength was retained remarkably well, even after up to 4 days in boiling water. In view of the generally poor hydrolytic stability of straight PBT after 4 days in boiling water (see for Example run number 16), it would be expected that impact strength after 4 days in boiling water would be significantly lower than impact strength of specimens made from the same compositions after only 2 days in boiling water. From a comparision of runs 24-27 of Table III (in which only one of the required additives was used) with runs 28-30 in which both of the required additives were used in accordance with the invention, it can be seen that hydrolytic stability was surprisingly good.

The above examples and especially example 2 show the unexpected advantage to be had by using both latex and epoxy additives in accordance with the invention in terms of improving hydrolytic stability of PBT molding compositions. The examples also show that this improvement is more significant with relatively lower molecular weight compositions, e.g. those having an IV. not exceeding about 1 then with compositions of higher intrinsic viscosity.

While the invention has been described above with respect to certain embodiments thereof, it will be understood by those skilled in the art that various changes and modifications may be made without departing from the spirit and scope of the invention.

What is claimed is:

1. Polyester composition comprising a blend of:
   (a) at least about 40 weight percent poly ($C_2$-$C_4$ alkylene terephthalate);
   (b) between about 0.1 and about 15 weight % based on poly ($C_2$-$C_4$ alkylene terephthalate) of a diepoxy compound represented by the general formula:

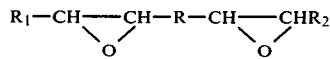

wherein $R_1$ and $R_2$ represent hydrogen, alkyl, cycloalkyl, aryl, or aralkyl, and $R_1$ and $R_2$ may be bonded to each other, and R represents alkylene, cycloalkylene, arylene, alkarylene or aralkylene, each of which may optionally have an ether group and/or an ester group, and R may be optionally bonded to $R_1$ and/or $R_2$; and
   (c) between about 5 and about 20 weight % based on poly ($C_2$-$C_4$ alkylene terephthalate) of a multiphase composite polymer comprising:
      (1) about 25 to about 95 weight percent of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethyleneically unsaturated monomer having a plurality of addition polymerizable reactive groups, at least one of which polymerizes at a substantially different rate of polymerization from at least one other of said reactive groups; and
      (2) about 75 to 5 weight percent of a final, rigid thermoplastic phase polymerized in the presence of said elastomeric phase.

2. Composition according to claim 1 wherein the poly ($C_2$-$C_4$ alkylene terephthalate) comprises at least about 60 weight percent poly(butylene terephthalate) having an intrinsic viscosity between about 0.5 and about 1.5 dl/g.

3. Composition according to claim 2 which also contains between about 5 and about 100 weight percent based on poly(butylene terephthalate) of glass reinforcing fibers.

4. Composition according to claim 1 wherein the final rigid thermoplastic phase of the multiphase polymer contains epoxy groups.

5. Composition according to claim 4 wherein the epoxy groups are derived from glycidyl acrylate or glycidyl methacrylate.

6. Composition according to claim 2 wherein said graftlinking monomer is allyl methacrylate or diallyl maleate.

7. Composition according to claim 2 wherein the crosslinking monomer is butylene diacrylate.

8. Composition according to claim 2 wherein the final rigid thermoplastic phase of the multiphase polymer is polymerized from a monomer system comprising from about 50 to 100 weight percent of a $C_1$ to $C_4$ alkyl methacrylate.

9. Composition according to claim 2 wherein the final phase monomer system is free of acid, hydroxyl, amino and amide groups and wherein the glass transition temperature of the final thermoplastic phase is at least about 20° C.

10. Composition according to claim 2 wherein said first phase of the multiphase polymer comprises between about 60 and about 95 weight percent of said multiphase polymer, said first phase is polymerized from a monomer system comprising between 95 and about 99.8 percent by weight butyl acrylate, between about 0.1 and about 2.5 weight percent butylene diacrylate as a crosslinking agent, and between about 0.1 and about 2.5 weight percent allyl methacrylate or diallyl maleate as a graftlinking agent and said final phase of said multiphase polymer is polymerized from about 60 to 100 weight percent methyl methacrylate.

11. Composition according to claim 2 wherein the diepoxy compound is selected from the group consisting of polycondensates of epihalohydrin with diol, bis-(2,3-epoxypropanol)-esters which are the product of esterification of dicarboxylic acid with 2,3-epoxypropanol, and cycloaliphatic diepoxides.

12. Composition according to claim 2 wherein the diepoxy compound is selected from the group consisting of polycondensates of epichlorohydrin with diphenololpropane.

13. Composition according to claim 2 wherein the diepoxy compound is selected from the group consisting of polycondensates of ephialohydrin with diol, bis-(2,3-epoxypropanol)-esters which are the product of esterification of dicarboxylic acid with 2,3-epoxypropanol, and cycloaliphatic diepoxides and wherein the first phase of the multiphase polymer comprises between about 60 and about 95 weight percent of said multiphase polymer, said first phase is polymerized from a monomer system comprising between 95 and 99.8 percent by weight butyl acrylate, between about 0.1 and about 2.5 weight percent butylene diacrylate as a crosslinking agent, and said final phase of said multiphase polymer is polymerized from about 60 to 100 weight percent methyl methacrylate.

* * * * *